(12) United States Patent
Minnock et al.

(10) Patent No.: US 10,233,713 B2
(45) Date of Patent: Mar. 19, 2019

(54) WELLHEAD ASSEMBLY AND METHOD (71) Applicant: CAMERON INTERNATIONAL CORPORATION, Houston, TX (US)

(72) Inventors: Kevin Minnock, Houston, TX (US); Hao Bin Huang, Houston, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 15/442,314

(22) Filed: Feb. 24, 2017

(65) Prior Publication Data

US 2017/0241229 A1    Aug. 24, 2017

Related U.S. Application Data (60) Provisional application No. 62/299,412, filed on Feb. 24, 2016.

(51) Int. Cl.
| | | |
|---|---|---|
| *E21B 33/00* | (2006.01) | |
| *E21B 33/04* | (2006.01) | |
| *F16L 21/02* | (2006.01) | |

(52) U.S. Cl.
CPC .............. *E21B 33/04* (2013.01); *F16L 21/02* (2013.01)

(58) Field of Classification Search
CPC .. E21B 33/04; F16L 21/02; F16J 15/16; F16J 15/166
See application file for complete search history.

(56) References Cited

U.S. PATENT DOCUMENTS

| | | | |
|---|---|---|---|
| 4,823,871 A * | 4/1989 | McEver ................ | E21B 33/043 166/182 |
| 5,307,879 A | 5/1994 | Kent | |
| 5,327,965 A | 7/1994 | Stephen et al. | |
| 5,355,961 A * | 10/1994 | Gariepy .................. | E21B 33/04 166/182 |
| 6,510,895 B1 | 1/2003 | Koleilat et al. | |
| 8,347,966 B2 * | 1/2013 | Nguyen .................. | E21B 33/04 166/338 |
| 2009/0322030 A1* | 12/2009 | Pallini, Jr. .............. | E21B 17/04 277/336 |
| 2010/0038089 A1* | 2/2010 | Gette ...................... | E21B 33/04 166/338 |
| 2010/0084143 A1* | 4/2010 | Dyson ................... | E21B 33/043 166/382 |

(Continued)

OTHER PUBLICATIONS

International Search Report and Written Opinion dated May 23, 2017, for International Patent Application No. PCT/US2017/019460.

*Primary Examiner* — Gilbert Y Lee
(74) *Attorney, Agent, or Firm* — Conley Rose, P.C.

(57) ABSTRACT

An embodiment of a tubing or casing hanger seal assembly includes a first carrier ring, a first energizing ring coupled to the first carrier ring and configured to set a first seal of the seal assembly in response to the application of a first load to the seal assembly, and a first lock ring configured to secure the first seal to the tubing or casing hanger in response to the application of the first load to the seal assembly, wherein the first carrier ring and the first lock ring include corresponding angled engagement profiles for providing a radial force against the first lock ring relative a central axis of the seal assembly in response to the application of the first load to the seal assembly.

20 Claims, 6 Drawing Sheets

(56) References Cited

U.S. PATENT DOCUMENTS

2011/0180275 A1    7/2011  Shaw
2013/0206427 A1*   8/2013  Reimert .................. E21B 33/04
                                                        166/387
2015/0101830 A1    4/2015  Sommerfeld et al.

* cited by examiner

WELLHEAD ASSEMBLY AND METHOD

CROSS-REFERENCE TO RELATED APPLICATIONS

This application claims benefit of U.S. provisional patent application Ser. No. 62/299,412 filed Feb. 24, 2016, and entitled "Wellhead Assembly and Method," which is hereby incorporated herein by reference in its entirety.

STATEMENT REGARDING FEDERALLY SPONSORED RESEARCH OR DEVELOPMENT

Not applicable.

BACKGROUND

Hydrocarbon drilling and production systems require various components to access and extract hydrocarbons from subterranean earthen formations. Such systems generally include a wellhead assembly through which the hydrocarbons, such as oil and natural gas, are extracted. The wellhead assembly may include a variety of components, such as valves, fluid conduits, controls, casings, hangers, and the like to control drilling and/or extraction operations. In some operations, hangers, such as tubing or casing hangers, may be used to suspend strings (e.g., piping for various fluid flows into and out of the well) in the well. Such hangers may be disposed or received in a housing, spool, or bowl. In addition to suspending strings inside the wellhead assembly, the hangers provide sealing to seal the interior of the wellhead assembly and strings from pressure inside the wellhead assembly. In some applications, each hanger disposed in the housing is sealed off against an inner surface of the housing with a seal or packoff assembly including a metal-to-metal seal. In some applications, the seal assembly is coupled to the hanger via a lock ring. In high pressure applications, the sealing assembly disposed radially between the housing and casing hanger may include two or more metal-to-metal seals, where each seal is set sequentially via a sequence of predetermined pressures or forces applied to the seal assembly. In this arrangement, a first seal of the seal assembly may be set or energized via the application of a first pressure to the seal assembly, and a second seal is set via the application of a second pressure to the seal assembly, where the second pressure is greater than the first pressure.

SUMMARY

An embodiment of a tubing or casing hanger seal assembly comprises a first carrier ring, a first energizing ring coupled to the first carrier ring and configured to set a first seal of the seal assembly in response to the application of a first load to the seal assembly, and a first lock ring configured to secure the first seal to the tubing or casing hanger in response to the application of the first load to the seal assembly, wherein the first carrier ring and the first lock ring comprise corresponding angled engagement profiles for providing a radial force against the first lock ring relative a central axis of the seal assembly in response to the application of the first load to the seal assembly. In some embodiments, the first lock ring has a radially inner position and a radially outer position, and wherein in the radially inner position the first lock ring is at least partially disposed in an annular groove extending into an outer surface of the tubing or casing hanger. In some embodiments, the first lock ring is frangibly coupled to the first energizing ring with a shear pin, and wherein the shear pin is configured to shear in response to the application of the first load to the seal assembly. In certain embodiments, the tubing or casing hanger seal assembly further comprises a first retainer ring disposed radially between the first carrier ring and the first energizing ring, wherein the first retainer ring is configured to provide for relative axial movement between the first carrier ring and the first energizing ring. In some embodiments, the tubing or casing hanger seal assembly further comprises a second energizing ring coupled to the first energizing ring and configured to set a second seal of the seal assembly in response to the application of the first load to the seal assembly, wherein the second seal is axially spaced from the first seal, and a second lock ring configured to secure the second seal to the tubing or casing hanger in response to the application of the first load to the seal assembly, wherein the first energizing ring and the second lock ring comprise corresponding angled engagement profiles configured to provide a radial force against the second lock ring in response to the application of the first load to the seal assembly. In some embodiments, the tubing or casing hanger seal assembly further comprises a second retainer ring disposed radially between the first energizing ring and the second energizing ring, wherein the second retainer ring is configured to provide for relative axial movement between the first energizing ring and the second energizing ring. In certain embodiments, the second lock ring has a radially inner position and a radially outer position, and wherein in the radially inner position the second lock ring is at least partially disposed in an annular groove extending into an outer surface of the tubing or casing hanger. In certain embodiments, the tubing or casing hanger seal assembly further comprises a second carrier ring coupled to the second energizing ring, wherein the second carrier ring is configured to support the weight of the seal assembly when the seal assembly is retrieved from the tubing or casing hanger by a running tool.

An embodiment of a tubing or casing hanger seal assembly comprises a first energizing ring configured to set a first seal of the seal assembly in response to the application of a first load to the seal assembly, and a first lock ring configured to secure the first seal to the tubing or casing hanger in response to the application of the first load to the seal assembly, wherein the first lock ring has a radially inner position and a radially outer position respective a central axis of the seal assembly, and wherein in the radially inner position the first lock ring is at least partially disposed in a first annular groove extending into an outer surface of the tubing or casing hanger. In some embodiments, when the first lock ring is disposed in the radially inner position, relative axial movement between the first lock ring and the first seal is restricted. In some embodiments, the first energizing ring comprises a variable diameter section configured to increase a radial force applied against the first seal in response to relative axial movement between the first energizing ring and the first seal. In certain embodiments, the tubing or casing hanger seal assembly further comprises a second energizing ring configured to set a second seal of the seal assembly in response to the application of the first load to the seal assembly, wherein the second seal is axially spaced from the first seal, and a second lock ring configured to secure the second seal to the tubing or casing hanger in response to the application of the first load to the seal assembly, wherein the second lock ring has a radially inner position and a radially outer position, and wherein in the radially inner position the second lock ring is at least partially disposed in a second annular groove extending into the outer surface of the tubing or casing hanger, wherein the first and second annular grooves of the tubing or casing hanger are axially spaced. In some embodiments, when the first lock ring and the second lock ring are each disposed in the radially outer position, the second lock ring is disposed at an axially shorter distance to the second annular groove than the first lock ring is disposed axially relative to the first annular groove. In certain embodiments, the first lock ring and the second lock ring are each configured to be displaced between their respective radially inner and radially outer positions in response to the application of the first load to the seal assembly. In certain embodiments, in response to the application of the first load to the seal assembly, the second lock ring is configured to be displaced into the radially inner position temporally prior to the displacement of the first lock ring into the radially inner position. In some embodiments, the first energizing ring is slidably coupled to the second energizing ring.

An embodiment of a method of actuating a tubing or casing hanger seal assembly comprises applying a first load to the seal assembly, setting a first seal of the seal assembly in response to the first load applied to the seal assembly, and following the setting of the first seal, setting a second seal of the seal assembly in response to the first load applied to the seal assembly. In some embodiments, the method further comprises displacing a first lock ring configured to secure the first seal to the tubing or casing hanger from a radially outer position into a radially inner position, wherein in the radially inner position the first lock ring is at least partially disposed in a first annular groove extending into an outer surface of the tubing or casing hanger. In some embodiments, the method further comprises displacing a second lock ring configured to secure the second seal to the tubing or casing hanger from a radially outer position into a radially inner position, wherein in the radially inner position the second lock ring is at least partially disposed in a second annular groove extending into an outer surface of the tubing or casing hanger. In certain embodiments, the second lock ring is displaced into the radially inner position temporally prior to the displacement of the first lock ring into the radially inner position.

BRIEF DESCRIPTION OF THE DRAWINGS

For a detailed description of exemplary embodiments, reference will now be made to the accompanying drawings in which.

DETAILED DESCRIPTION

In the drawings and description that follow, like parts are typically marked throughout the specification and drawings with the same reference numerals. The drawing figures are not necessarily to scale. Certain features of the disclosed embodiments may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . ". Any use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

Figure 1:
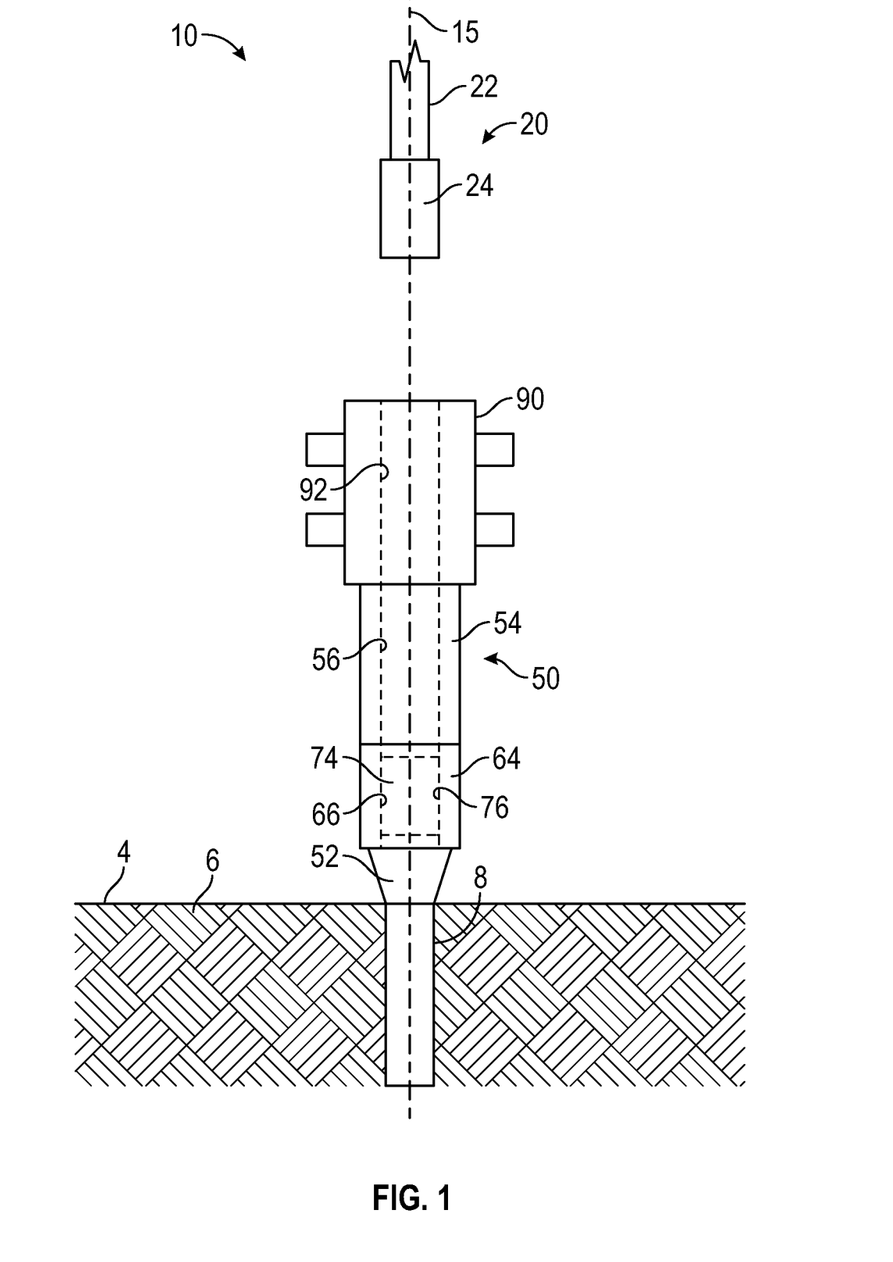
FIG. 1 is a schematic view of an embodiment of a wellhead system in accordance with principles disclosed herein.

FIG. 1 is a schematic diagram showing an embodiment of a well system 10 having a central or longitudinal axis 15. The well system 10 can be configured to extract various minerals and natural resources, including hydrocarbons (e.g., oil and/or natural gas), or configured to inject substances into an earthen surface 4 and an earthen formation 6 via a well or wellbore 8. In some embodiments, the well system 10 is land-based, such that the surface 4 is land surface, or subsea, such that the surface 4 is the seal floor. The system 10 includes a wellhead 50 that can receive a tool or tubular string conveyance 20. The wellhead 50 is coupled to a wellbore 8 via a wellhead connector or hub 52. The wellhead 50 typically includes multiple components that control and regulate activities and conditions associated with the wellbore 8. For example, the wellhead 50 generally includes bodies, valves and seals that route produced fluids from the wellbore 8, provide for regulating pressure in the wellbore 8, and provide for the injection of substances or chemicals downhole into the wellbore 8.

In the embodiment shown, the wellhead 50 includes a Christmas tree or tree 54, a tubing and/or casing spool or housing 64, and a tubing and/or casing hanger 74. For ease of description below, reference to "tubing" shall include casing and other tubulars associated with wellheads. Further, "spool" may also be referred to as "housing," "receptacle," or "bowl." A blowout preventer (BOP) 90 may also be included, either as a part of the tree 54 or as a separate device. The BOP 90 may include a variety of valves, fittings, and controls to prevent oil, gas, or other fluid from exiting the wellbore 8 in the event of an unintentional release of pressure or an overpressure condition. The system 10 may include other devices that are coupled to the wellhead 50, and devices that are used to assemble and control various components of the wellhead 50. For example, in the illustrated embodiment, the system 10 includes tool conveyance 20 including a tool 24 suspended from a tool or drill string 22. In certain embodiments, tool 24 comprises a running tool that is lowered (e.g., run) from an offshore vessel (not shown) to the wellbore 8 and/or the wellhead 50. In other embodiments, such as land surface systems, tool 24 may include a device suspended over and/or lowered into the wellhead 50 via a crane or other supporting device.

The tree 54 generally includes a variety of flow paths, bores, valves, fittings, and controls for operating the wellbore 8. The tree 54 may provide fluid communication with the wellbore 8. For example, the tree 54 includes a tree bore 56. The tree bore 56 provides for completion and workover procedures, such as the insertion of tools into the wellbore 8, the injection of various substances into the wellbore 8, and the like. Further, fluids extracted from the wellbore 8, such as oil and natural gas, may be regulated and routed via the tree 54. As is shown in the system 10, the tree bore 56 may fluidly couple and communicate with a BOP bore 92 of the BOP 90.

The spool 64 provides a base for the tree 54. The spool 64 includes a spool bore 66. The spool bore 66 fluidly couples to enable fluid communication between the tree bore 56 and the wellbore 8. Thus, the bores 92, 56, and 66 may provide access to the wellbore 8 for various completion and workover procedures. For example, components can be run down to the wellhead 50 and disposed in the spool bore 66 to seal off the wellbore 8, to inject fluids downhole, to suspend tools downhole, to retrieve tools downhole, and the like. For instance, casing and/or tubing hangers may be installed within spool 64 via the access provided by bores 92, 56, and 66. In some embodiments, the casing and/or tubing hangers are conveyed to the wellhead 50 via tool conveyance 20 for installation within spool bore 64. In certain embodiments, associated components of the casing and/or tubing hangers, such as seal or packoff assemblies, are installed within spool bore 66 via tool 24 of conveyance tool 20. As will be described further herein, in some embodiments the tool 24 is configured to apply a force and/or pressure to energize or "set" components of wellhead 50 within spool bore 66.

As one of ordinary skill in the art understands, the wellbore 8 may contain elevated pressures. For example, the wellbore 8 may include pressures that exceed 10,000 pounds per square inch (PSI). Accordingly, well system 10 employs various mechanisms, such as mandrels, seals, plugs and valves, to control and regulate the well 8. For example, the hanger 74 is typically disposed within the wellhead 50 to secure tubing and casing suspended in the wellbore 8, and to provide a path for hydraulic control fluid, chemical injections, and the like. The hanger 74 includes a hanger bore 76 that extends through the center of the hanger 74, and that is in fluid communication with the spool bore 66 and the wellbore 8.

Figure 2:
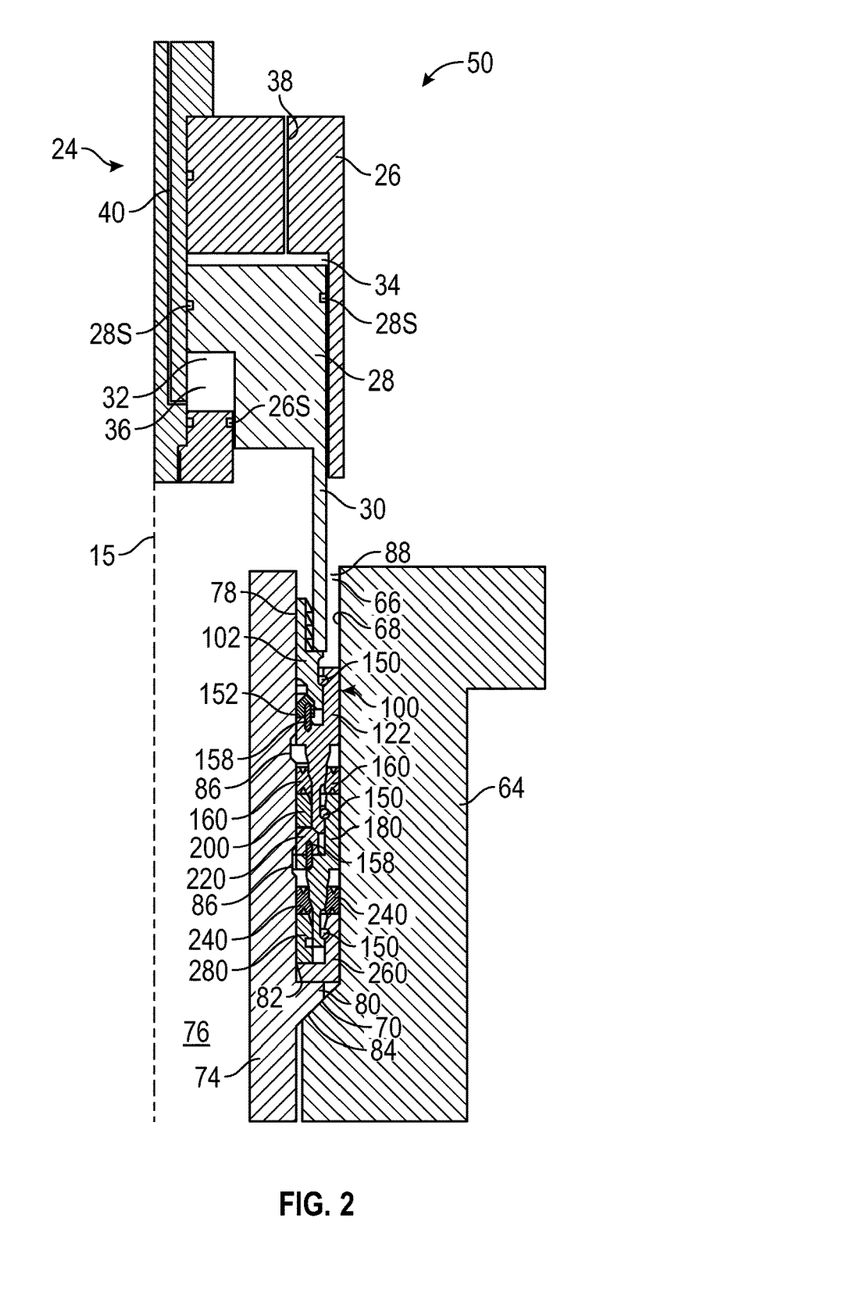
FIG. 2 is a schematic cross-sectional view of an embodiment of a seal assembly of the wellhead system of FIG. 1 shown in a run-in position, in accordance with principles disclosed herein.

Referring to FIG. 2, a schematic cross-sectional view of an annular seal assembly 100 of the spool 64 of FIG. 1 is shown. Particularly, FIG. 2 schematically illustrates spool 64, hanger 74, and tool 24 in partial cross-section. Thus, spool 64, hanger 74, and tool 24 may include additional components not explicitly shown in FIG. 2. As will be discussed further, FIGS. 3 and 4 also illustrate spool 64, hanger 74, and tool 24 schematically in partial cross-section. In the embodiment shown in FIG. 2, the bore 66 of spool 64 is defined by a generally cylindrical inner surface 68 including an annular landing profile 70 extending radially inwards towards longitudinal axis 15. In the embodiment shown, hanger 74 includes a generally cylindrical outer surface 78 including a radially outwards extending annular flange 80, where flange 80 forms a first or upper annular shoulder 82 and a second or lower annular shoulder 84. The outer surface 78 of hanger 74 further includes a pair of axially spaced (relative longitudinal axis 15) annular grooves 86 extending therein.

In this arrangement, an annulus 88 is formed between the inner surface 68 of spool 64 and the outer surface 78 of hanger 74. The landing profile 70 of spool 64 is configured to matingly engage the lower shoulder 84 of hanger 74 to physically support hanger 74 within the bore 66 of spool 64. In some applications, hanger 74 is conveyed into bore 66 of spool 64 by conveyance tool 20 until lower shoulder 84 of hanger 74 physically engages the landing profile 70 of spool 64, thereby arresting the downward displacement (relative surface 4) of hanger 74 through bore 66 of spool 64. As will be described further herein, the upper shoulder 82 of hanger 74 is configured to receive and position seal assembly 100 within the annulus 88 formed between spool 64 and hanger 74.

In the embodiment shown in FIG. 2, tool 24 comprises a running tool configured to install seal assembly 100 within the annulus 88 formed between spool 64 and hanger 74. Specifically, tool 24 is configured to convey seal assembly 100 from an offshore vessel (not shown) to the wellhead 50, and into the annulus 88 such that a lower end of seal assembly 100 is disposed directly adjacent or physically engages upper shoulder 82 of hanger 74. However, in other embodiments the seal assembly 100 may be conveyed to wellhead 50 in conjunction with hanger 74 such that seal assembly 100 is disposed about the outer surface 78 of hanger 74 as hanger 74 is conveyed to the wellhead 50 by conveyance tool 20. In the embodiment shown, tool 24 is also configured to energize or set seal assembly 100 such that seal assembly 100 provides sealing engagement between the inner surface 68 of spool 64 and the outer surface 78 of hanger 74 to seal annulus 88. As will be described further herein, running tool 24 is particularly configured to actuate seal assembly 100 from a first or run-in position (shown in FIGS. 2 and 3) to a second or set position (shown in FIG. 4), where in the set position the seal assembly 100 seals annulus 88 between the inner surface 68 of spool 64 and the outer surface 78 of hanger 74.

In the embodiment shown in FIG. 2, tool 24 generally includes a cylinder or housing 26 and an annular piston 28 slidably disposed within an annular bore 32 extending within cylinder 26. Bore 32 of cylinder 26 is sealed from the surrounding environment via an annular seal 26s that sealingly engages an outer surface of piston 28. The outer surface of piston 28 includes a pair of annular seals 28s for sealingly engaging corresponding surfaces of cylinder 26, thereby forming a first chamber 34 and a second chamber 36 within bore 32, where fluid communication is restricted between chambers 34 and 36. Piston 28 further includes an annular piston plate 30 extending from bore 32 of cylinder 26 for engaging seal assembly 100.

Cylinder 26 also includes a first fluid passage 38 in fluid communication with first chamber 34, and a second fluid passage 40 in fluid communication with second chamber 36. In this arrangement, piston 28 is displaceable between a first or upper (relative seal assembly 100) position (shown in FIG. 2) and a second or lower position (shown in FIG. 4). Specifically, a differential pressure may be applied across piston 28 to displace piston 28 through bore 32 between the upper and lower positions. For instance, fluid within first chamber 34 may be pressurized via first fluid passage 38 while pressure is reduced within second chamber 36, thereby applying a differential pressure force against piston 28 to shift piston 28 from the upper position to the lower position. Conversely, fluid within second chamber 36 may be pressurized via second fluid passage 40 while pressure is reduced within first chamber 34, thereby applying a differential pressure force against piston 28 to shift piston 28 from the lower position to the upper position. In some embodiments, fluid pressure is selectably provided to first fluid passage 38 and second fluid passage 40 from pressurized fluid disposed within drill string 22. In other embodiments, fluid pressure is selectably provided to passages 38 and 40 from accumulators (not shown) coupled to wellhead 50.

As will be described further herein, actuating piston 28 from the upper position to the lower position is configured to actuate seal assembly 100 from the run-in position shown in FIGS. 2 and 3, to the set position shown in FIG. 4. In this manner, tool 24 may be utilized to selectably actuate seal assembly 100 into the set position. In addition, in some embodiments tool 24 is configured to retrieve seal assembly 100 from the bore 66 of spool 64 prior to or following actuation of seal assembly 100 into the set position. For instance, over the service life of seal assembly 100, it may become necessary to replace or refurbish seal assembly 100, such as due to a reduction in the sealing integrity provided by seal assembly 100, or for other reasons.

Figure 3:
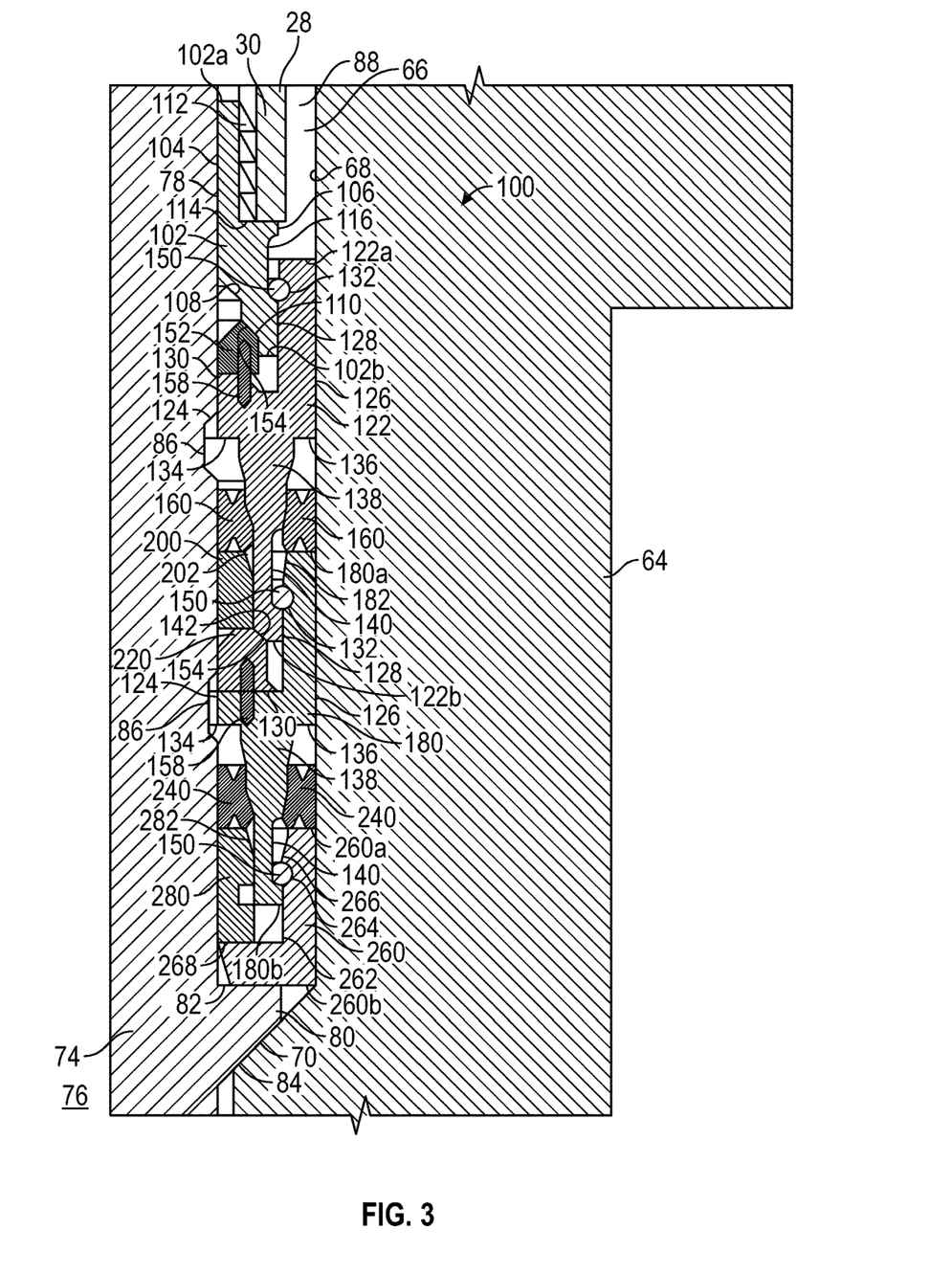
FIG. 3 is a cross-sectional, enlarged view of the seal assembly of FIG. 2.

Referring to FIG. 3, in the embodiment shown seal assembly 100 has a central or longitudinal axis coaxial with longitudinal axis 15 and comprises a dual seal packoff assembly for providing two independent seals or seal assemblies for sealing the annulus 88 disposed between the inner surface 68 of spool 64 and the outer surface 78 of hanger 74. In this manner, fluid communication through annulus 88 between spool 64 and hanger 74 may be restricted. Particularly, the employment of dual, independent annular seals may be advantageous in high pressure wellhead applications, as well as in applications including the presence of dangerous substances, such as hydrogen sulfide. Seal assembly 100 is configured to allow for the sequential setting of each independent seal with a single force or pressure applied against seal assembly 100. Conversely, in traditional sequentially-set dual seal assemblies each seal requires a distinct setting pressure or force. Specifically, the first seal to be set, typically the lower seal of the dual seal assembly, is set at a first pressure or force. Once the first seal is set, a second pressure or force is applied to the seal assembly to subsequently set the second seal of the dual seal assembly, where the second pressure/force is greater than the first pressure/force. The need for employing two distinct pressures/forces for independently setting the seals of the traditional dual seal assembly increases the maximum load applied to the dual seal assembly, requiring components with greater load tolerances as well as increasing the risk of "undersetting" or "oversetting" (i.e., improperly setting the seals, thereby reducing their sealing integrity) the seals of the traditional dual seal assembly. Traditional dual seal assemblies also require additional components for individually setting each seal, reducing the space efficiency of the dual seal assembly. Thus, seal assembly 100 is configured to reduce the overall load required for setting each seal of seal assembly 100 and the risk of undersetting or oversetting. In addition, seal assembly 100 is configured to maximize space efficiency, rendering seal assembly 100 suitable for applications providing minimal space for the seal assembly disposed between the spool or housing (e.g., spool 64) and the hanger (e.g., hanger 74).

In the embodiment shown, seal assembly 100 generally includes a first or upper carrier ring 102, a first or upper energizing ring 122, a first or upper lock ring 152, a pair of first or upper annular seals 160, a second or lower energizing ring 180, a first or upper load or support ring 200, a second or lower lock ring 220, a pair of second or lower annular seals 240, a second or lower carrier ring 260, and a second or lower load or support ring 280. Upper carrier ring 102 is configured to interface with the piston plate 30 of annular piston 28 and support the weight of seal assembly 100 in embodiments where seal assembly 100 is either conveyed to or retrieved from wellhead 50 independent from hanger 74.

In the embodiment shown, upper carrier ring 102 has a first or upper end 102a, a second or lower end 102b, and includes a radially inner surface 104 and a radially outer surface 106. The inner surface 104 of upper carrier ring 102 includes an annular groove 108 extending axially from lower end 102b and radially into upper carrier ring 102. Annular groove 108 includes an annular angled shoulder or engagement profile 110 for engaging upper lock ring 152. The outer surface 106 of upper carrier ring 102 includes a plurality of engagement members or teeth 112 extending from upper end 102a, an annular shoulder 114 facing upper end 102a, and an annular groove 116 disposed axially between shoulder 114 and lower end 102b. Engagement members 112 of upper carrier ring 102 are configured to physically engage and grapple a running tool (e.g., tool 24) for conveying seal assembly 100 to and from wellhead 50. In the embodiment shown, engagement members 112 are configured to grapple the piston plate 30 of annular piston 28 for conveying seal assembly 100.

As will be described further herein, upper energizing ring 122 is configured to "energize" or set the pair of upper annular seals 160 such that seals 160 seal annulus 88. In the embodiment shown, upper energizing ring 122 has a first or upper end 122a, a second or lower end 122b, and includes a radially inner surface 124 and a radially outer surface 126. The inner surface 124 of upper energizing ring 122 includes an annular groove 128 extending axially from upper end 122a and radially into upper energizing ring 122, forming an upper annular shoulder 130 that faces upper end 122a. Annular groove 128 and upper shoulder 130 form an annular recess disposed radially therebetween for receiving the lower end 102b of upper carrier ring 102 when seal assembly 100 is actuated into the set position. Annular groove 128 includes an annular slot 132 extending therein and disposed proximal upper end 122a. Inner surface 124 further includes a lower annular shoulder 134 axially spaced from upper annular shoulder 130 and facing lower end 122b of upper energizing ring 122. Similarly, the outer surface 126 of upper energizing ring 122 includes an annular shoulder 136 facing lower end 122b and axially disposed proximal lower annular shoulder 134 of inner surface 124.

Still referring to FIG. 3, in the embodiment shown, upper energizing ring 122 also includes a variable diameter section 138 extending axially from annular shoulders 134 and 136 towards lower end 122b, where variable diameter section 138 is configured to physically engage the pair of upper seals 160 of sealing assembly 100. Specifically, variable diameter section 138 has a generally conical cross-sectional area and generally decreases in diameter or cross-sectional width moving axially towards lower end 122b of upper energizing ring 122 from an upper end of variable diameter section 138. In this arrangement, relative axial movement between upper energizing ring 122 and upper seals 160 results in increasing or decreasing a radial force applied to upper seals 160 from upper energizing ring 122. Specifically, relative axial movement of upper energizing ring 122 towards upper seals 160 results in an increase in radial force applied against upper seals 160 by upper energizing ring 122, while relative axial movement of upper energizing ring 122 away from upper seals 160 results in a decrease in radial force applied to upper seals 160 by upper energizing ring 122. The outer surface 126 of upper energizing ring 122 also includes an annular groove 140 extending axially substantially between a lower end of variable diameter section 138 and the lower end 122b of upper energizing ring 122. Also, the inner surface 124 of upper energizing ring 122 further includes an angled shoulder or engagement profile 142 for engaging lower lock ring 220.

In the embodiment shown in FIG. 3, seal assembly 100 also includes a first or upper retainer ring or wire 150 disposed in both the annular groove 116 of upper carrier ring 102 and annular slot 132 of upper energizing member 122, thereby slidably coupling upper carrier ring 102 with upper energizing member 122. In this arrangement, upper retainer ring 150 allows for limited axial movement between upper carrier ring 102 and upper energizing member 122 while providing a connection between rings 102 and 122. Particularly, while relative axial movement between upper retainer ring 150 and upper energizing ring 122 is restricted, upper retainer ring 150 is allowed to be displaced along the axial extent of annular groove 116, thereby allowing for limited relative axial movement between upper retainer ring 150 and upper carrier ring 102.

In the run-in position of seal assembly 100 shown in FIG. 3, upper lock ring 152 is coupled with upper energizing ring 122 via a shear pin 158 extending between an aperture disposed in the upper annular shoulder 130 of upper energizing ring 122 and an aperture disposed in upper lock ring 152. Upper lock ring 152 is configured to secure upper energizing ring 122 and upper seals 160 into position once seal assembly 100 has been actuated into the set position such that relative axial movement between hanger 74 and upper seals 160 is restricted. In certain embodiments, upper seals 160 comprise metal-to-metal seals known in the art for use in wellheads of well systems. However, in other embodiments, upper seals 160 may comprise other seals known in the art for use in well systems. As shown in FIG. 3, the radially inner seal 160 of the pair of upper seals 160 is configured to sealingly engage the outer surface 78 of hanger 74 and the inner surface 124 of upper energizing ring 122 while the radially outer seal 160 is configured to sealingly engage the inner surface 68 of spool 64 and the outer surface 126 of upper energizing ring 122.

Figure 4:
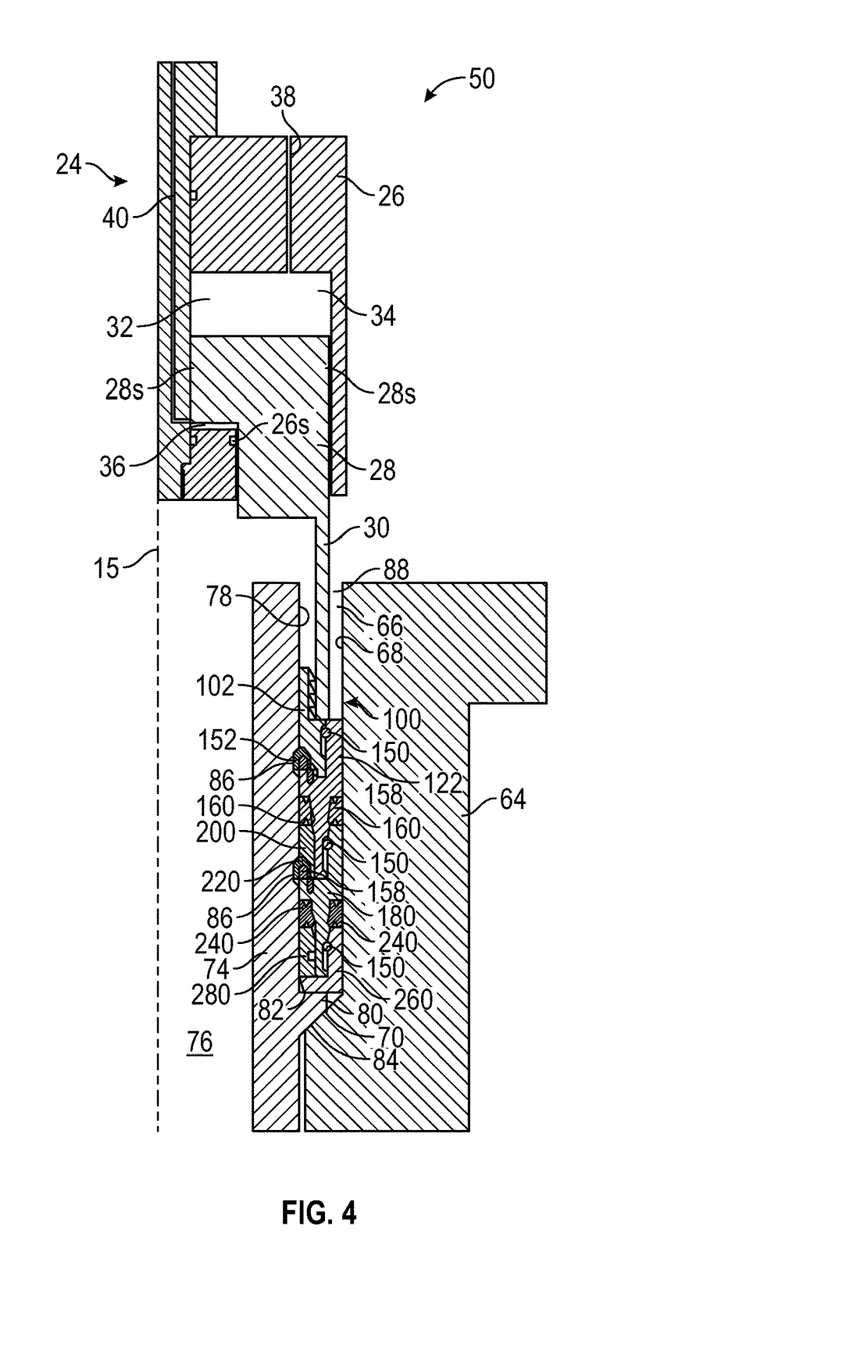
FIG. 4 is a schematic cross-sectional view of the seal assembly of FIG. 2 shown in a set position.

In the embodiment shown, shear pin 158 is configured to provide a frangible connection between upper energizing ring 122 and upper lock ring 152 such that rings 122 and 152 remain coupled or secured while seal ring assembly 100 is disposed in the run-in position, but are allowed to separate via shearing of shear pin 158 in response to annular seal assembly 100 being actuated into the set position shown in FIG. 4. Also, in the run-in position of seal assembly 100, a lower end of upper lock ring 152 is disposed directly adjacent or physically engages annular shoulder 130 while an annular angled surface or engagement profile 154 disposed at an upper end of upper lock ring 152 is disposed directly adjacent or physically engages the corresponding engagement profile 110 of upper carrier ring 102. In this arrangement, axial forces imparted to upper carrier ring 102, such as by piston 28, may produce a radially inwards force on upper lock ring 152 via the angled engagement provided by corresponding engagement profiles 154 and 110 of upper lock ring 152 and upper carrier ring 102, respectively. Further, in the run-in position of seal assembly 100, upper lock ring 152 is disposed proximal with, but axially above the upper groove 86 of the pair of annular grooves 86 of hanger 74. Moreover, in the run-in position the annular shoulders 134 and 136 of upper energizing ring 122 are axially spaced from the upper end of each upper annular seal 160.

Still referring to FIG. 3, the lower energizing ring 180 is configured to provide a seating surface for the radially outer seal 160 of the pair of upper annular seals 160 and to selectably energize the pair of lower annular seals 240 in response to the actuation of annular seal assembly 100 from the run-in position to the set position, such as by the actuation of tool 24. Lower energizing ring 180 has a first or upper end 180a and a second or lower end 180b. In the embodiment shown, lower energizing ring 180 is configured similarly to upper energizing ring 122, and shared features are labeled similarly. However, in this embodiment, unlike upper energizing ring 122, the lower energizing ring 180 does not include an annular recess disposed between annular groove 128 and upper shoulder 130 for receiving the lower end 122b of upper energizing ring 122. In addition, the lower end 180b of lower energizing ring 180 does not include the angled engagement profile 142 of upper energizing ring 122. However, in other embodiments, lower energizing ring 180 may include these features, as well as other features not shown in FIG. 3.

Upper support ring 200 is disposed between the inner surface 124 of upper energizing ring 122 and the outer surface 78 of hanger 74 and is generally configured to provide a seating surface for the radially inner seal 160 of the pair of upper annular seals 160, and to transmit loads applied to upper carrier ring 102 from tool 24 to the lower lock ring 220 when annular seal assembly 100 is actuated into the set position shown in FIG. 4. In the arrangement shown in FIG. 3, an upper end of upper support ring 200 is disposed directly adjacent or physically engages a lower end of the radially inner seal 160 while a lower end of upper support ring 200 is disposed directly adjacent or physically engages an upper end of lower lock ring 220. In this embodiment, the upper end of upper support ring 200 is substantially axially aligned with the upper end 180a of lower energizing ring 180 to axially align the pair of upper annular seals 160; however, in other embodiments the upper ends of rings 180 and 200 need not be axially aligned.

In the embodiment shown, a portion of a radially outer surface of upper support ring 200 includes an angled surface 202 for providing radial clearance for the variable diameter section 138 of upper energizing ring 122. Similarly, a portion of the inner surface 124 of lower energizing ring 180 includes an angled surface 182 extending axially from upper end 180a for providing radial clearance for variable diameter section 138. Particularly, in certain embodiments, when annular seal assembly 100 is actuated into the set position upper energizing ring 122 is displaced axially downwards relative upper support ring 200 and lower energizing ring 180, necessitating radial clearance for the variable diameter section 138 of upper energizing ring 122 as the lower end 122b of ring 122 travels through the annular groove 128 of lower energizing ring 180.

Similar to the arrangement of upper energizing ring 122 and the pair of upper seals 160, when annular seal assembly 100 is disposed in the run-in position the annular shoulders 134 and 136 of lower energizing ring 180 are axially spaced from the upper end of each corresponding lower annular seal 240. Further, in this embodiment, in the run-in position of seal assembly 100, lower lock ring 220 is disposed proximal with and partially axially overlaps the lower groove 86 of the pair of annular grooves 86 of hanger 74. In other words, the lower lock ring is disposed at an axially shorter distance to the lower annular groove 86 than the upper lock ring 152 is disposed axially relative the upper annular groove 86 when the seal assembly 100 is disposed in the run-in position. In this arrangement, in response to downward displacement of energizing rings 122, 180 and lock rings 152, 220 (i.e., in response to a force applied against upper carrier ring 102), the lower lock ring 220 is radially displaced into the lower annular groove 86 temporally prior to upper lock ring 152 entering the upper annular groove 86, given that lower lock ring 220 has a shorter distance to travel prior to entering its respective groove 86 relative upper lock ring 152.

In the embodiment shown, lower annular seals 240 are configured similarly to upper annular seals 160; however, in other embodiments lower annular seals 240 may comprise a different type of annular seal than annular seals 160, depending upon the application. Moreover, similar to the arrangement of upper carrier ring 102 and upper energizing ring 122, lower energizing ring 180 is slidably coupled to upper energizing ring 122 via a second or intermediate retainer ring 150 disposed in the annular slot 132 of lower energizing ring 180 and the annular groove 140 of upper energizing ring 122. In this arrangement, axial movement is allowed between intermediate retainer ring 150 and the terminal ends of annular groove 140, thereby allowing limited axial movement between upper energizing ring 122 and lower energizing ring 180. In this manner, lower energizing ring 180 may be secured to upper energizing ring 122 during conveyance of annular seal assembly 100 to and from the wellhead 50.

In the embodiment shown, lower carrier ring 260 is configured to provide a seat for the radially outer seal 240 of lower annular seals 240, and to locate the annular shoulder 82 of hanger 74 for properly seating seal assembly 100 within the annulus 88 formed between spool 64 and hanger 74. For instance, in certain embodiments, seal assembly 100 is displaced through annulus 88 by a tool (e.g., tool 24) until a lower end of lower carrier ring 260 seats against annular shoulder 82. Lower carrier ring 260 is also configured to support lower support ring 280 and the radially inner seal 240 of lower annular seals 240 during conveyance to and from the wellhead 50. In the embodiment shown, lower carrier ring 260 has a first or upper end 260a, a second or lower end 260b, and a radially inner surface 262 extending between ends 260a and 260b. Inner surface 262 of lower carrier ring 260 includes: an annular slot 264 for receiving a third or lower retainer ring 150, an angled surface 266 extending from upper end 260a for providing radial clearance for the variable diameter section 138 of lower energizing ring 180, and an annular shoulder 268 facing lower support ring 280 for physically supporting lower support ring 280 during conveyance of annular seal assembly 100. Further, lower retainer ring 150 is disposed in both annular slot 264 of lower carrier ring 260 and the annular groove 140 of lower energizing ring 180. Similar to the arrangements described above with respect to upper and intermediate retainer rings 150 and their associated components, the arrangement of lower retainer ring 150 provides for limited relative axial movement between lower energizing ring 180 and lower carrier ring 260 (i.e., slidably coupling lower energizing ring 180 and lower carrier ring 260). In this manner, lower energizing ring 180 and lower carrier ring 260 may remain coupled during conveyance of seal assembly 100 while also allowing lower energizing ring 180 to be displaced axially relative lower carrier ring 260 when seal assembly 100 is actuated from the run-in position shown in FIGS. 2 and 3 to the set position shown in FIG. 4.

In the embodiment shown, lower support ring 280 is disposed axially between the radially inner seal 240 of lower annular seals 240 and the annular shoulder 268 of lower carrier ring 260 such that an upper end of lower support ring 280 physically engages or is disposed directly adjacent a lower end of the radially inner lower seal 240 while a lower end of lower support ring 280 physically engages or is disposed directly adjacent annular shoulder 268. In this embodiment, the upper end of lower support ring 280 is substantially aligned with the upper end 260a of lower carrier ring 260 to axially align the pair of lower annular seals 240; however, in other embodiments the upper ends of rings 260 and 280 need not be in substantial axial alignment. In the embodiment shown, lower support ring 280 includes an angled surface 282 extending axially from the upper end of lower support ring 280 for providing radial clearance for the variable diameter section 138 of lower energizing ring 180. In this arrangement, the radial clearance provided by angled surfaces 282 and 266 allow for axial displacement of lower energizing ring 180 during the actuation of seal assembly 100 into the set position shown in FIG. 4.

Figure 5:
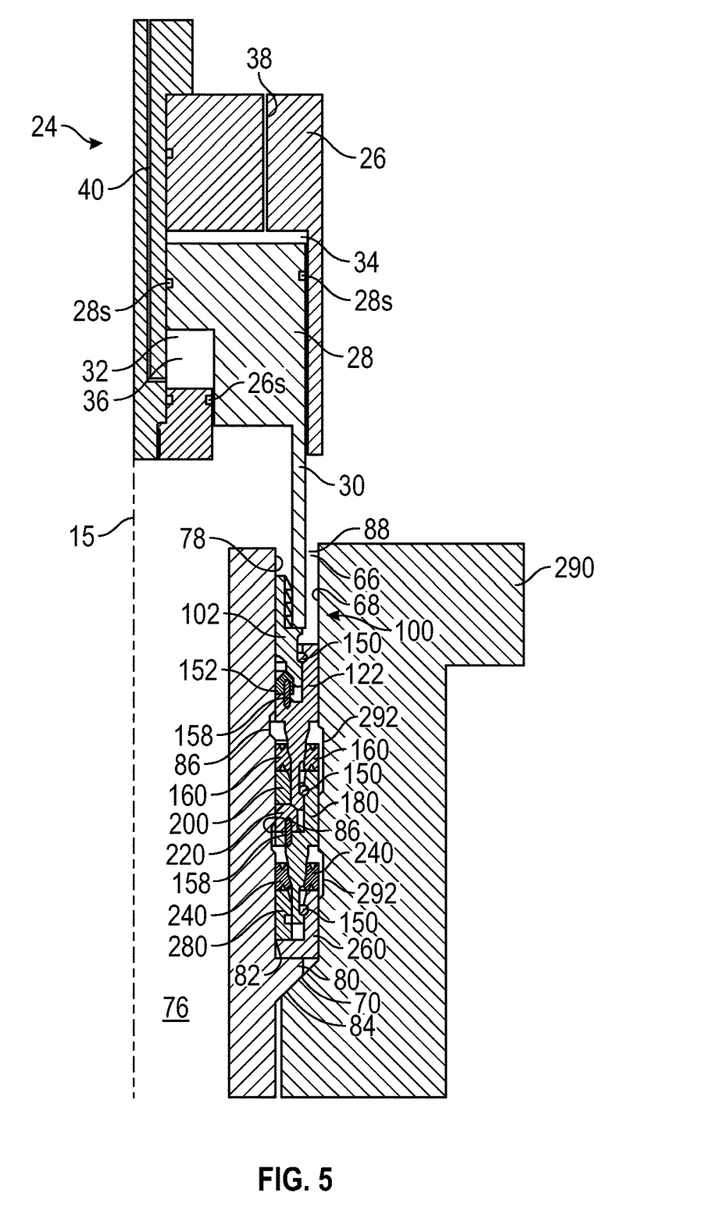
FIG. 5 is a schematic cross-sectional view of another embodiment of a spool of the wellhead system shown in FIG. 1, in accordance with principles disclosed herein.

Referring now to FIG. 5, a schematic cross-section view of annular seal assembly 100 is shown with an alternative embodiment of a spool 290 for use in wellhead 50 shown in FIG. 1. Similar to FIGS. 2-4, FIG. 5 schematically illustrates spool 290 in partial cross-section. Thus, spool 290 may include additional components now explicitly shown in FIG. 2. Further, spool 290 includes features in common with spool 64 described above, and shared features are labeled similarly. In the embodiment shown, the inner surface 68 of spool 290 includes a pair of axially spaced annular grooves 292, with each annular groove 292 in axial overlapping alignment with a corresponding annular seal 160 or 240. In other words, the upper annular groove 292 is axially overlaps with the upper annular seals 160 and the lower annular groove 292 is in axially overlaps with lower annular seals 240. In this embodiment, annular grooves 292 of spool 290 comprise sealing surfaces for sealingly engaging the corresponding radially outer annular seals 160 and 240. With the sealing surfaces disposed in annular grooves 292, the sealing surfaces are protected from scratching or other damage resulting from impacts or other physical engagements with tools being run through the bore 66 of spool 290. Annular sealing assembly 100 may thus be utilized in conjunction with either spool 64 or spool 290, as well as other spools, bowls, or housings known in the art.

Referring to FIGS. 2-4 and 6, FIG. 6 is a flowchart illustrating an embodiment of a method for actuating a seal assembly of a tubing or casing hanger. Starting at block 302 of method 300, a first load is applied to an annular seal assembly of a wellhead. In certain embodiments, block 302 includes conveying annular seal assembly 100 to the wellhead 50 (shown in FIG. 1) and disposing seal assembly 100 within the annulus 88 formed between spool 64 and hanger 74 such that the lower end 260b of physically engages or is disposed directly adjacent annular shoulder 82 of hanger 74. In this embodiment, block 302 may include conveying seal assembly 100 to the wellhead using a running tool, such as tool 24. In certain embodiments, block 302 includes disposing annular seal assembly 100 within annulus 88 with seal assembly 100 disposed in the run-in position shown in FIGS. 2 and 3.

Figure 6:
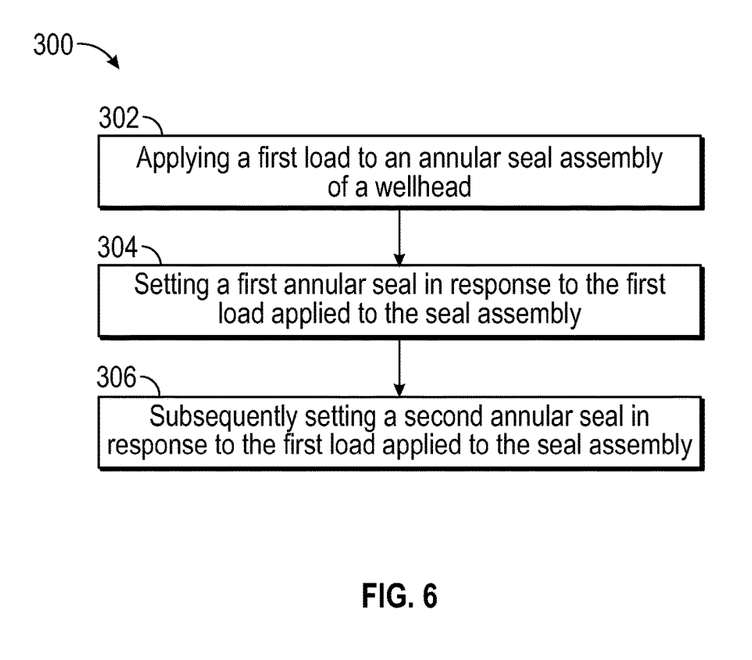
FIG. 6 is a flowchart of an embodiment of a method for actuating a seal assembly of a wellhead system in accordance with principles disclosed herein.

In some embodiments, block 302 comprises actuating a running tool (e.g., tool 24) to apply a first load against annular seal assembly 100, such as via physical engagement between piston 28 of tool 24 and the annular shoulder 114 of upper carrier ring 102. In this embodiment, block 302 may include increasing a fluid pressure within first chamber 34 of cylinder 26 to create a differential pressure force across piston 28, which is transmitted to the annular seal assembly 100 as a first load via physical engagement between a terminal end of piston plate 30 of piston 28 and the annular shoulder 114 of upper carrier ring 102. In other embodiments, block 302 includes a applying a first fluid pressure directly against the upper end 102a of upper carrier ring 102, where the first fluid pressure corresponds to the first load applied to the seal assembly 100.

At block 304 of method 300, a first annular seal is set in response to the first load applied to the seal assembly. In certain embodiments, block 304 includes axially displacing upper energizing ring 122 and lower energizing ring 180 downwards concurrently in response to displacement of piston 28 within cylinder 26 until the lower end 180b of lower energizing ring 180 physically engages or is disposed directly adjacent annular shoulder 268 of lower carrier ring 260. In this embodiment, as lower energizing ring 180 is displaced downwards, a radial load is applied to the pair of lower annular seals 240 in response to the increasing diameter of the variable diameter section 138 of lower energizing ring 180, causing lower seals 240 to set or seal off the annulus 88 via sealing engagement with the surfaces of ring 180, hanger 74, and spool 64. In certain embodiments, annular shoulders 134 and 136 of lower energizing ring 180 and the upper ends of lower carrier ring 260 and lower support ring 280 may apply an axially compressive load against lower annular seals 240 to set the seals 240.

Also in this embodiment, as energizing rings 122, 180 and lock rings 152, 220 (rings 152 and 220 being disposed in a radially outer position as shown in FIGS. 2 and 3) are axially displaced within annulus 88, the shear pin 158 frangibly coupling lower lock ring 220 and lower energizing ring 180 is sheared in response to a radial force communicated to lower lock ring 220 from lower energizing ring 180 via the angled engagement provided between engagement profiles 154 and 142, respectively, which translates part of the axial first load applied to upper carrier ring 102 into a radially inwards directed (i.e., radially towards longitudinal axis 15) force against lower lock ring 220. In response to the application of the radial force against lower lock ring 220, ring 220 is displaced radially into a radially inner position (shown in FIG. 4) at least partially within lower annular groove 86 of hanger 74.

At block 306 of method 300, following the setting of the first annular seal, a second annular seal is set in response to the first load applied to the seal assembly. In certain embodiments, subsequent to the radial displacement of lower lock ring 220 into the lower annular groove 86, the upper energizing ring 122 is permitted to travel further downwards towards annular shoulder 130 of lower lock ring 180 in response to the continued application of the first load until the lower end 122b of ring 122 physically engages or is disposed directly adjacent annular shoulder 130 of lower energizing ring 180, as shown in FIG. 4. In this embodiment, as upper energizing ring 122 travels towards annular shoulder 130 of lower energizing ring 180, the shear pin 158 frangibly coupling upper lock ring 152 and upper energizing ring 122 is sheared in response to a radial force communicated to upper lock ring 152 from upper carrier ring 102 via the angled engagement provided between engagement profiles 154 and 110, respectively, which translates part of the axial first load applied to upper carrier ring 102 into a radially inwards directed force against upper lock ring 152.

In response to the application of the radial force, upper lock ring 152 is displaced radially into a radially inner position at least partially within the upper annular groove 86 of hanger 74, as shown in FIG. 4. Thus, second lock ring 220 is displaced into the radially inner position temporally prior to the displacement of upper lock ring 152 into the radially inner position. In this embodiment, as upper energizing ring 122 is displaced downwards, a radial load is applied to the pair of upper annular seals 160 in response to the increasing diameter of the variable diameter section 138 of upper energizing ring 152, causing upper seals 160 to set or seal off the annulus 88 (in conjunction with lower annular seals 240) via sealing engagement with the surfaces of ring 122, hanger 74, and spool 64. In certain embodiments, annular shoulders 134 and 136 of upper energizing ring 122 and the upper ends of lower energizing ring 180 and upper support ring 200 may apply an axially compressive load against upper annular seals 160 to set the seals 160. In this manner, the axially spaced upper annular seals 160 and lower annular seals 240 seal annulus 88 at two independent, axially spaced locations, thereby providing a sequentially-set "dual" seal of annulus 88. In certain embodiments, following the setting of upper annular seals 160 and lower annular seals 240, the first load applied against seal assembly 100 is reduced or eliminated. In this embodiment, piston 28 may be retracted from the lower position shown in FIG. 4 to the upper position shown in FIG. 2 via reducing fluid pressure within first chamber 34 and increasing pressure within second chamber 36 to create a differential pressure force across piston 28.

Although the embodiment of method 300 shown in FIG. 6 only includes blocks 302, 304 and 306, in other embodiments, method 300 may also include retrieving seal assembly 100 from annulus 88 either in the run-in or set positions. In this embodiment, a tool (e.g., tool 24) couples with the engagement members 112 of upper carrier ring 102, securing seal assembly 100 to the tool. Subsequently, the tool is retracted or conveyed upwards through bore 66 of spool 64 with seal assembly 100 coupled thereto. Particularly, the seal assembly 100 may be retrieved via applying an upward force (i.e., axially away from shoulder 82 of hanger 74) against engagement members upper carrier ring 102 via engagement members 112 using piston 28 of tool 24. The upward force causes upper carrier ring 102 to move axially upwards relative upper energizing ring 122 until upper retainer ring 150 engages a lower terminal end of annular groove 116 of upper carrier ring 102, thereby transmitting the upward axial force to upper energizing ring 122. In response to the application of the force to upper energizing ring 122, upper lock ring 152 slides radially outwards out of upper annular groove 86 into the radially outer position in response to a reactive (reacting against the upward axial force applied to upper lock ring 152 via annular shoulder 130) radial force between corresponding angled surfaces or engagement profiles of upper lock ring 152 and annular groove 86.

With upper lock ring 152 in the radially outer position, upper energizing ring 122 is free to travel upwards through annulus 88 in concert with upper carrier ring 102. Following upward travel of upper energizing ring 122, the intermediate retainer ring 150 engages a lower terminal end of annular groove 140 of upper energizing ring 122, transmitting the upward force to lower energizing ring 180. Similar to the movement of upper lock ring 152, a radially outwards force directs lower lock ring 220 into a radially outwards position until lower energizing ring 180 (along with upper support ring 200 and upper annular seals 160) is free to travel upwards in concert with upper energizing ring 122. Finally, following upward travel of lower energizing ring 180, lower retainer ring 150 engages a lower terminal end of the annular groove 140 of lower energizing ring 180, causing both lower carrier ring 260, lower support ring 280, and lower annular seals 280 to be raised upward along with lower energizing ring 180, thereby allowing for the retrieval of the entirety of annular seal assembly 100 from annulus 88 via tool 24.

The above discussion is meant to be illustrative of the principles and various embodiments of the present disclosure. While certain embodiments have been shown and described, modifications thereof can be made by one skilled in the art without departing from the spirit and teachings of the disclosure. The embodiments described herein are exemplary only, and are not limiting. Accordingly, the scope of protection is not limited by the description set out above, but is only limited by the claims which follow, that scope including all equivalents of the subject matter of the claims.

What is claimed is:

1. A tubing or casing hanger seal assembly comprising:
   a first carrier ring;
   a first energizing ring coupled to the first carrier ring and configured to set a first seal of the seal assembly in response to the application of a first load to the seal assembly; and
   a first lock ring configured to secure the first seal to the tubing or casing hanger in response to the application of the first load to the seal assembly;
   wherein the first carrier ring and the first lock ring comprise corresponding angled engagement profiles each disposed at a non-ninety degree angle relative a central axis of the seal assembly for providing a radial force against the first lock ring relative the central axis of the seal assembly in response to the application of the first load to the seal assembly.

2. The seal assembly of claim 1, wherein the first lock ring has a radially inner position and a radially outer position, and wherein in the radially inner position the first lock ring is at least partially disposed in an annular groove extending into an outer surface of the tubing or casing hanger.

3. The seal assembly of claim 1, wherein the first lock ring is frangibly coupled to the first energizing ring with a shear pin, and wherein the shear pin is configured to shear in response to the application of the first load to the seal assembly.

4. The seal assembly of claim 1, further comprising a first retainer ring disposed radially between the first carrier ring and the first energizing ring, wherein the first retainer ring is configured to provide for relative axial movement between the first carrier ring and the first energizing ring.

5. The seal assembly of claim 1, further comprising:
   a second energizing ring coupled to the first energizing ring and configured to set a second seal of the seal assembly in response to the application of the first load to the seal assembly, wherein the second seal is axially spaced from the first seal; and
   a second lock ring configured to secure the second seal to the tubing or casing hanger in response to the application of the first load to the seal assembly;
   wherein the first energizing ring and the second lock ring comprise corresponding angled engagement profiles configured to provide a radial force against the second lock ring in response to the application of the first load to the seal assembly.

6. The seal assembly of claim 5, further comprising a second retainer ring disposed radially between the first energizing ring and the second energizing ring, wherein the second retainer ring is configured to provide for relative axial movement between the first energizing ring and the second energizing ring.

7. The seal assembly of claim 5, wherein the second lock ring has a radially inner position and a radially outer position, and wherein in the radially inner position the second lock ring is at least partially disposed in an annular groove extending into an outer surface of the tubing or casing hanger.

8. The seal assembly of claim 5, further comprising a second carrier ring coupled to the second energizing ring, wherein the second carrier ring is configured to support the weight of the seal assembly when the seal assembly is retrieved from the tubing or casing hanger by a running tool.

9. A tubing or casing hanger seal assembly comprising:
   a first energizing ring configured to set a first seal of the seal assembly in response to the application of a first load to the seal assembly; and
   a first lock ring configured to secure the first seal to the tubing or casing hanger in response to the application of the first load to the seal assembly;
   wherein the first lock ring has a radially inner position and a radially outer position respective a central axis of the seal assembly, and wherein in the radially inner position the first lock ring is at least partially disposed in a first annular groove extending into an outer surface of the tubing or casing hanger and the first lock ring is disposed on a radially inner side of the first energizing ring.

10. The seal assembly of claim 9, wherein, when the first lock ring is disposed in the radially inner position, relative axial movement between the first lock ring and the first seal is restricted.

11. The seal assembly of claim 9, wherein the first energizing ring comprises a variable diameter section configured to increase a radial force applied against the first seal in response to relative axial movement between the first energizing ring and the first seal.

12. The seal assembly of claim 9, further comprising:
   a second energizing ring configured to set a second seal of the seal assembly in response to the application of the first load to the seal assembly, wherein the second seal is axially spaced from the first seal; and
   a second lock ring configured to secure the second seal to the tubing or casing hanger in response to the application of the first load to the seal assembly;
   wherein the second lock ring has a radially inner position and a radially outer position, and wherein in the radially inner position the second lock ring is at least partially disposed in a second annular groove extending into the outer surface of the tubing or casing hanger, wherein the first and second annular grooves of the tubing or casing hanger are axially spaced.

13. The seal assembly of claim 12, wherein, when the first lock ring and the second lock ring are each disposed in the radially outer position, the second lock ring is disposed at an axially shorter distance to the second annular groove than the first lock ring is disposed axially relative to the first annular groove.

14. The seal assembly of claim 12, wherein the first lock ring and the second lock ring are each configured to be displaced between their respective radially inner and radially outer positions in response to the application of the first load to the seal assembly.

15. The seal assembly of claim 14, wherein, in response to the application of the first load to the seal assembly, the second lock ring is configured to be displaced into the radially inner position temporally prior to the displacement of the first lock ring into the radially inner position.

16. The seal assembly of claim 12, wherein the first energizing ring is slidably coupled to the second energizing ring.

17. A method of actuating a tubing or casing hanger seal assembly comprising:
applying a first load to the seal assembly;
setting a first seal of the seal assembly with a first energizing ring in response to the first load applied to the seal assembly;
displacing a first lock ring configured to secure the first seal to the tubing or casing hanger from a radially outer position into a radially inner position;
following the setting of the first seal, setting a second seal of the seal assembly with a second energizing ring in response to the first load applied to the seal assembly; and
following the displacement of the first lock ring into the radially inner position, displacing a second lock ring configured to secure the second seal to the tubing or casing hanger from a radially outer position into a radially inner position.

18. The method of claim 17, wherein in the radially inner position the first lock ring is at least partially disposed in a first annular groove extending into an outer surface of the tubing or casing hanger.

19. The method of claim 17, wherein in the radially inner position the second lock ring is at least partially disposed in a second annular groove extending into an outer surface of the tubing or casing hanger.

20. The method of claim 19, wherein the second lock ring is displaced into the radially inner position temporally prior to the displacement of the first lock ring into the radially inner position.

* * * * *